(No Model.) 3 Sheets—Sheet 1.

J. W. DAVIS.
CLOVER THRESHER ATTACHMENT.

No. 579,259. Patented Mar. 23, 1897.

Witnesses:

Jesse Wisman Davis
Inventor.
By Edson Bro's
Att'ys.

(No Model.) 3 Sheets—Sheet 2.

J. W. DAVIS.
CLOVER THRESHER ATTACHMENT.

No. 579,259. Patented Mar. 23, 1897.

Witnesses:

Jesse Wisman Davis,
Inventor.
By Edson Bro's
Attys.

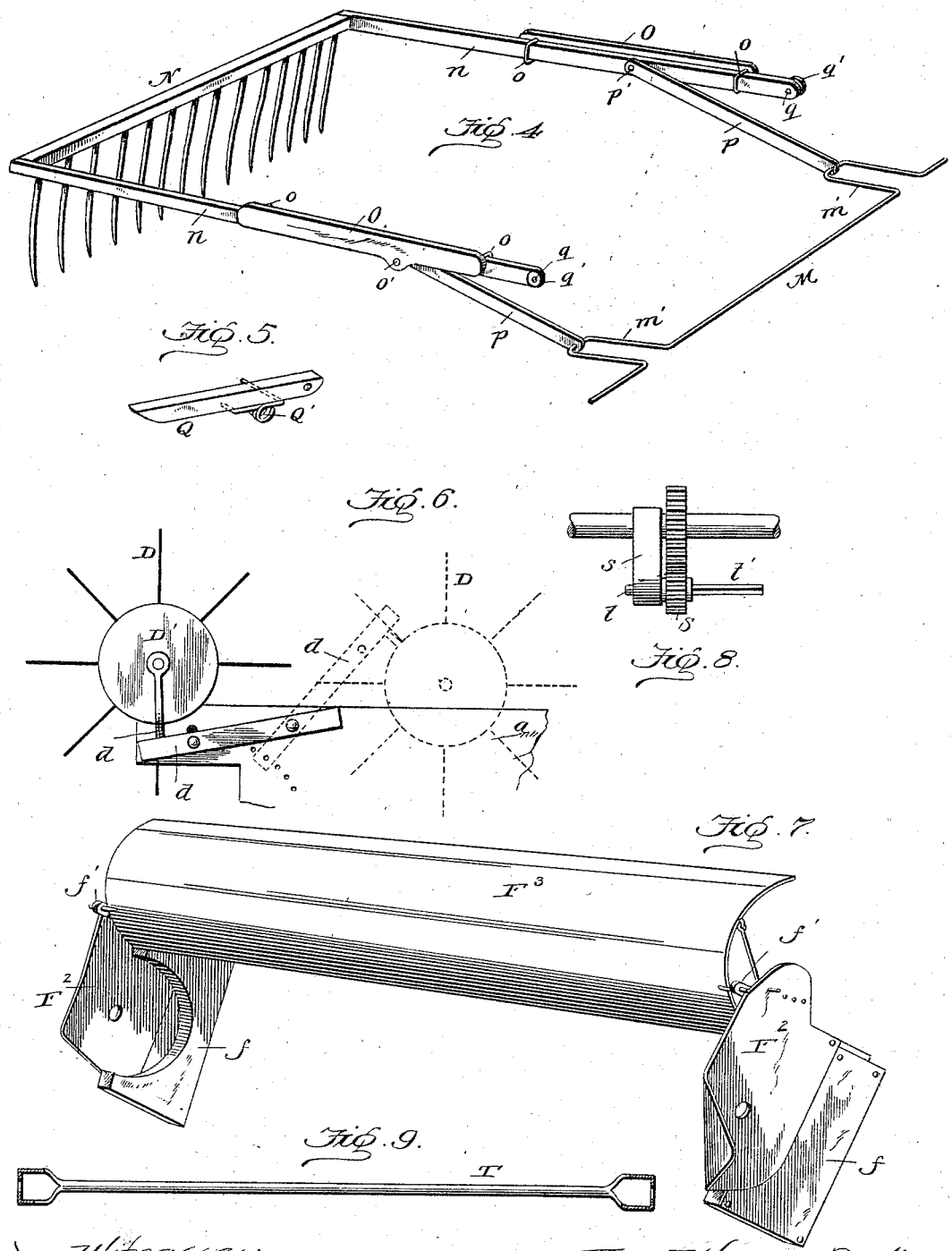

UNITED STATES PATENT OFFICE.

JESSE WISMAN DAVIS, OF ESSARY SPRINGS, TENNESSEE, ASSIGNOR OF ONE-HALF TO DANIEL H. McDONALD, OF SAME PLACE, AND CHARLEY H. JOYNER, OF POCAHONTAS, TENNESSEE.

CLOVER-THRESHER ATTACHMENT.

SPECIFICATION forming part of Letters Patent No. 579,259, dated March 23, 1897.

Application filed March 14, 1896. Serial No. 583,203. (No model.)

*To all whom it may concern:*

Be it known that I, JESSE WISMAN DAVIS, a citizen of the United States, residing at Essary Springs, in the county of Hardeman and State of Tennessee, have invented certain new and useful Improvements in Clover-Threshing Attachments; and I do hereby declare the following to be a full, clear, and exact description of the invention, such as will enable others skilled in the art to which it appertains to make and use the same.

My invention relates to a clover harvester and thresher; and the primary object that I have in view is to provide an attachment designed to be coupled to and derive the power for operating the same from a mowing-machine.

A further object of the invention is to provide means which will strip the heads from the stalks of growing clover, as well as cut down the crop, thereby partially separating pods or heads and the stalks of the clover preparatory to feeding the same to the threshing mechanism.

A further object of the invention is to provide a novel form of conveying mechanism, operating within the harvester, to take the clover stalks and heads from the combing and cutting mechanism and deliver the same automatically to the threshing mechanism.

A further object of the invention is to provide a novel form of threshing mechanism on the portable machine so constructed and arranged, as the machine travels over the field, to thresh the seed from the heads and stalks and to separate the seed from the chaff and refuse.

With these ends in view my invention consists in the novel combination and organization of devices and in the construction and arrangement of parts which will be hereinafter fully described and claimed.

To enable others to understand my invention, I have illustrated the preferred embodiment of the same in the accompanying drawings, forming a part of this specification, in which—

Figure 1:
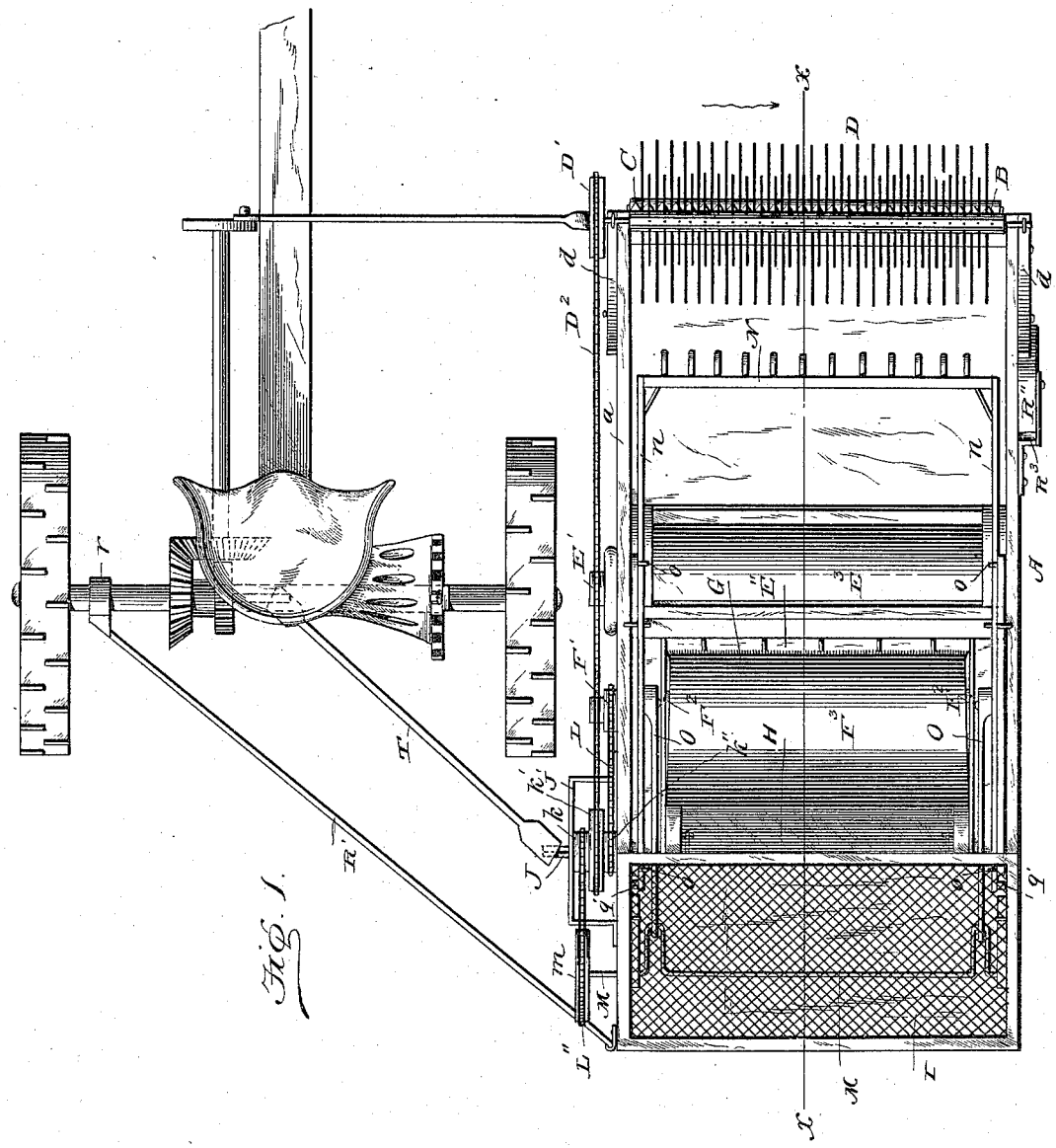
Figure 2:
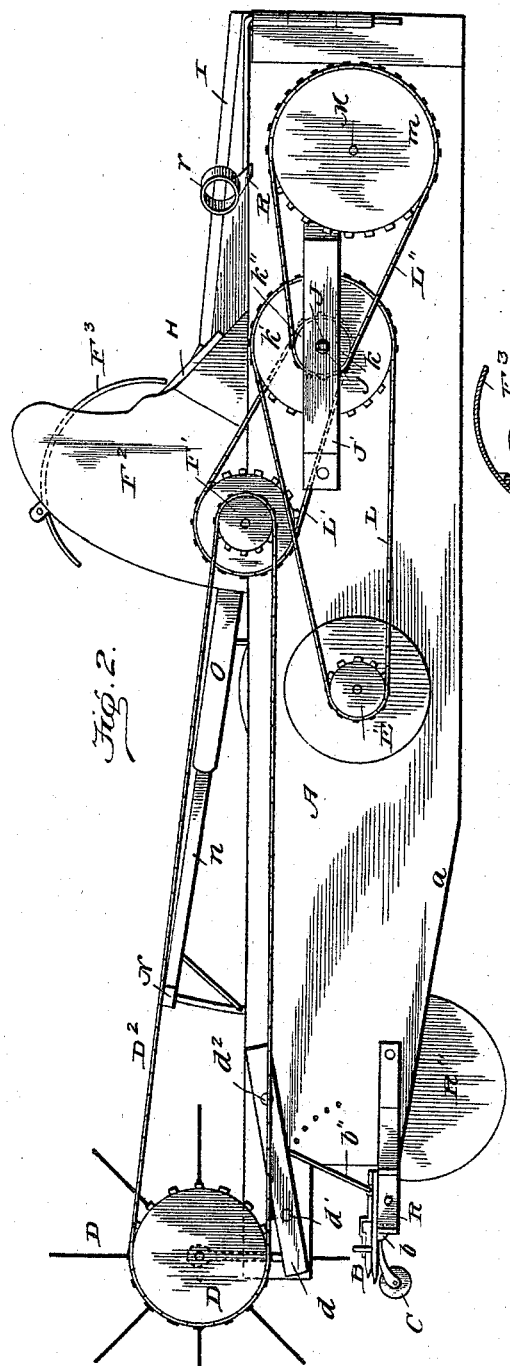
Figure 3:
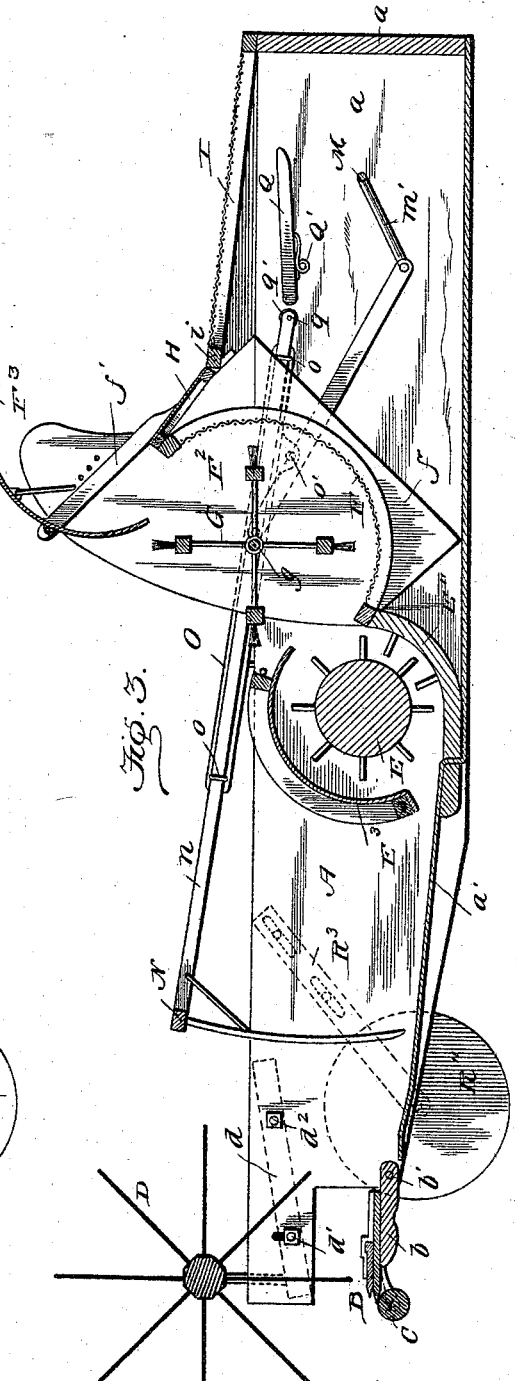

Figure 1 is a plan view of my traveling harvester and thresher, showing a part of one type of mowing-machine to which my invention may be coupled. Fig. 2 is an elevation of my machine, looking at the side next to the mowing-machine. Fig. 3 is a longitudinal vertical sectional view on the plane indicated by the dotted line $x\,x$ of Fig. 1. Fig. 4 is a detail view of conveyer rake or fork mechanism, and Fig. 5 is a detail of one of the movable cam-tracks for the rake or fork actuating arms. Fig. 6 is a detail illustrating one form of bearings by which the comb-cylinder may be hung in position over the cutter apparatus, to be thrown back out of place when the machine is to be transported to or from the field. Fig. 7 is a detail showing the fenders for the rotary brush and illustrating the means for holding the hinged top fender in position. Figs. 8 and 9 are detail views of the power-transmitting devices by which motion can be taken from the axle of the mowing-machine and applied to the driving-gearing for operating the various mechanisms of my clover harvester and thresher.

Like letters of reference denote corresponding parts in all the figures of the drawings, referring to which—

A designates the traveling casing of my portable harvester and thresher, which casing is adapted to ride upon and over the ground and which may be coupled by suitable devices with the sickle-bar, knuckle, and axle of any suitable type of mowing-machine. The casing shown in the accompanying drawings consists of the side sills or beams $a$ and a metallic bottom $a'$, the whole united together in a secure manner to form a substantial durable structure. The front end of the metallic bottom $a'$ of this casing is inclined or turned up slightly to better adapt it to pass over the stubble as the machine advances across the field, and at its open front end this casing A carries a cutter apparatus B, which is similar in substantial particulars to the cutter apparatus of mowing-machines or harvesters in that it consists of the forked guard-beam and a reciprocating sickle-bar reciprocated or driven by the usual mechanism on the mowing-machine to which my harvester and thresher is to be coupled.

In my machine the cutter apparatus extends across the open front of the slightlyupturned end of the casing, and it is carried by a rocking bar or plate $b$, which is pivoted or hung, as at $b'$, in the protruding front ends of the beams $a$ $a$, said rocking bar or plate $b$ being held at a suitable angle or inclination by a suitable detent, one form of which consists of a locking-rod $b''$, pivoted to the end of the hinged carrier-bar or plate $b$ and fitting into any one of a series of apertures in the outer side or face of one of the beams $a$, as shown by Fig. 2. Of course the particular means for holding the carrier bar or plate and the cutter apparatus may be varied within the skill of the mechanic. Below this cutter apparatus is a guard-roller C, the shaft or trunnions of which are journaled in brackets or bearings attached to the carrier bar or plate $b$, so that the roller C is movable with the carrier bar or plate and maintains at all times the same relative position to the cutter apparatus. This guard-roller projects somewhat in advance of the cutter apparatus, and its function is to deflect or throw the clover-stalks a little in advance of the cutter apparatus and in such relation to the comb-cylinder D that the teeth or wires on the cylinder D will sweep through the heads of clover before the clover-stalks are reached and severed by the cutter apparatus, whereby said guard-roller and comb-cylinder are combined in a novel way to gather the clover heads or pods before the clover is cut down by the cutter apparatus and prepare the clover somewhat preliminary to feeding the mass to the threshing mechanism. The guard-roller C is, however, so positioned with relation to the cutter apparatus, and the teeth of the comb-cylinder are of such length, that the comb-cylinder operates to sweep the clover-stalks over the guard-roller and between the fingers of the cutter apparatus, so that the stalks will be severed by the reciprocating cutter, but not before the comb-cylinder will have had an opportunity to partially strip off the heads of clover, as previously explained. This comb-cylinder consists of a longitudinal shaft provided with a very large number of closely-arranged radial teeth or wires, and this comb-cylinder is hung across the open front end of the casing above the cutter mechanism and in position for its teeth or wires to sweep close to the cutter mechanism.

The shaft of the comb-cylinder D is journaled in bearings on the arms $d$ $d$, which are attached to the protruding front ends of the sills $a$ by means of bolts $d'$ $d^2$. By removing the front bolts $d'$ the arms $d$, and with them the comb-cylinder, may be turned back over and upon the front part of the casing A, so that the comb-cylinder is out of operative relation to the cutter apparatus, as when it is desired to transport the machine to or from the field; but when the arms $d$ are turned forward into substantially horizontal positions and the bolts $d'$ are placed in position the arms support the comb-cylinder securely in place over the cutter apparatus. To one end of the shaft of the comb-cylinder is secured a sprocket-wheel D', around which passes a sprocket-chain D², which also passes around one of the sprocket-wheels on a double sprocket F', hereinafter described.

At a suitable point in rear of the cutter apparatus and comb-cylinder, and at an intermediate point of the length of the casing A, is arranged the threshing-cylinder E. This threshing-cylinder extends transversely across the casing A, between the sills or beams $a$ thereof, and its shaft is journaled in suitable bearings on said sills $a$. The threshing-cylinder is provided with spikes or teeth, which sweep close to the metallic bottom $a'$ of the casing A and to the concave or breast E'', the latter being secured within the casing A and extending upwardly from the bottom thereof to a suitable height above said bottom $a'$, the concave or breast being provided with suitable teeth between which the teeth or spikes on the cylinder may sweep. The breast or concave terminates on a line below the overhanging edge of a shield or fender E³, preferably of sheet metal, attached to a suitable skeleton framing that is pivoted or hung at its lower edge in the sills $a$ at a suitable height above the metallic bottom $a'$ to leave an opening for the passage of the clover to the cylinder and concave. A discharge-opening is provided between the upper edge of the concave and the overhanging edge of the shield, and through this opening passes the threshed clover stalks, heads, and the seed. The pivoted fender E³ for the thresher-cylinder is limited in its rearward-swinging motion by suitable stop devices, and it may be turned forward at will to permit inspection of the cylinder and breast. In rear of this threshing mechanism is the screening and brushing mechanism, which operates to separate the clover-seed from the chaff and refuse. The screen F is of convex form, situated transversely across the casing and just in rear of the breast or concave E'', the lower front edge of this concave screen F joining the rear side of the breast or concave, at or near the upper edge thereof. This screen is held in place by being attached to the curved edges or seats of the uprights $f$. Suitably secured within the casing A and at the ends of the concave screen are the end fenders F² F², which are attached to the uprights $f$ and which extend a suitable distance above the same. On the upper inclined edges of the uprights $f$ are attached the forwardly-inclined arms $f'$, in the free ends of which is pivoted the upper transverse fender or shield F³, which is arranged to overhang the screen F and the rotary brush, so as to deflect the substances thrown upwardly by the action of said rotary brush. This transverse fender is curved and hung so as to project over and rearwardly beyond the upper rear edge of the concave screen, so that the substances which strike against the shield or fender will fall beyond the screen F and drop upon the inclined chute H, and thence be deposited on the stationary horizontal screen I.

The chute H preferably consists of a fabric or other suitable material which is attached to a suitable skeleton framework which is seated on the inclined upper ends of the uprights $f$. The horizontal screen I is composed of wire fabric of suitable mesh to permit the clover-seed to pass therethrough, and this fabric is stretched upon and secured to a frame which is hung or pivoted at its forward end to the uprights $f$, as at $i$, the frame being so proportioned as to cover the whole top side of the casing A in rear of the screening mechanism. The frame for the screen I rests upon the rear part of the casing A, and it can be lifted at will to permit access to the clover-seed contained or deposited in the receptacle at the rear end of the casing A. As this horizontal screen I is exposed and readily accessible at all times, the refuse deposited thereon by the action of the brush can be readily removed at any time. The concave screen F consists of a metallic or wire screen of suitable size meshes to permit the clover-seed to pass through the interstices, or to be forced therethrough by the action of the rotary brush; but this screen F will exclude chaff, stems, and other refuse from passing through and being commingled with the clover-seed.

The rotary brush G consists of a shaft $g$, the spiders, longitudinal arms or bars attached to the spiders, and bristles carried by the longitudinal arms, the whole being assembled to produce a substantial structure. This brush is arranged over the screen, and the shaft $g$ is journaled in suitable bearings attached to sills $a$ of the casing.

The shaft of the threshing-cylinder and the brush-shaft have their ends extended or carried through one of the sills $a$ of the casing, and on the brush-shaft is secured the double pulley F', while the shaft of the threshing-cylinder is provided with the chain-pulley E'.

Attached to one side of the casing A is a bracket J', in which is journaled a power-shaft J, one end of which extends beyond the bracket and is made square or of other angular form, as at $j$. On this power-shaft is provided three pulleys or a triplicate pulley, (indicated at $k$ $k'$ $k''$,) of which the pulleys $k$ $k''$ are smaller than and are disposed on opposite sides of the pulley $k'$. Around the pulley $k'$ passes a chain or belt L, which extends to and passes around the sprocket wheel or pulley E' on the shaft of the threshing-cylinder. Around the pulley $k''$ passes a similar chain or belt L', which extends to and passes around one member of the double pulley or wheel F', and from the other member of this double pulley extends an endless belt or chain D², which extends to and passes around the wheel or pulley D' on the comb-cylinder shaft, whereby the brush-shaft is driven from the pulley $k''$ of the power-shaft, and this brush-shaft in turn drives the comb-cylinder shaft through the duplicate pulley F', the endless chain D², and the wheel or pulley D'. Around the smaller wheel or pulley $k$ on the power-shaft passes an endless chain or belt L'', which extends rearward to and around a wheel or pulley $m$, which is secured to a protruding end of a transverse crank-shaft M, which lies at the rear part of the casing A and is journaled in suitable bearings in the sills $a$. This crank-shaft M furnishes the power by which the reciprocating fork or conveyer is operated to transfer the clover harvested by the cutter apparatus and comb-cylinder to the cylinder and concave to be threshed thereby. In the operation of this raking conveyer or transfer mechanism it is essential that the rake-teeth shall travel upon the bottom $a'$ of the casing when the rake is drawn to carry the clover from the front end of the casing A to the threshing mechanism to be taken up by the toothed cylinder E, but when the rake is making its return movement from the threshing mechanism toward the cutter apparatus it is necessary that it shall be lifted clear of the mass of clover on the bottom $a'$ and be returned back to its forward position while it is raised or elevated to prevent the rake from carrying back with it any of the clover that has already been raked toward the threshing mechanism. I accomplish these objects by the construction of rake shown more clearly by Figs. 4 and 5 of the drawings. The rake-head N consists of a cross-bar provided with the usual or any preferred kind of teeth, and this rake-head N is rigidly attached to the slidable bars $n$ $n$, which extend over the cylinder and its fender and between the end fenders of the screen F and the sills or beams $a$ of the casing. These reciprocating bars $n$ $n$ are fitted loosely in guides or clips $o$ $o$, which are attached to the ends of the rocking bars or supports O O, the latter being pivoted, as at $o'$, to the beams or sills $a$ of the casing. The crank-shaft M has the two similarly-arranged cranks $m'$, to which are connected the pitmen $p$ $p$, which extend forward and have their free ends pivoted to the slidable rake-bars $n$ $n$ at suitable points intermediate of the length of the bars $n$, as at $p'$. The extreme rear ends of the slidable bars $n$ of the rake are provided with bolts or arbors $q$, on which are loosely mounted the antifriction-rollers $q'$, and these rollers travel or ride against the yieldable cam-tracks Q, arranged on the sides $a$ of the casing at points in rear of the oscillating bars or supports O. These cam-tracks are sustained in substantially horizontal positions by means of the tension-springs Q', but the rear ends of the cam-tracks are adapted to yield or give when the rollers $q'$ travel on their upper sides during the rearward movement of the rake toward the threshing mechanism. When the rake-head N is advanced to a position in rear of the cutter apparatus and the comb-cylinder, the crank-shaft M is in a position where the cranks $m'$ are at their farthest forward stroke or movement. As the shaft turns the cranks $m'$ are raised to an upright position to raise the rear ends of the arms $n$ and to adapt the rollers to travel on the upper side of the cam-tracks, and when the crank-shaft has made a quarter-turn the rake-arms $n$ and the head N are drawn rearward. As the shaft M nears its half-turn the arms $n$ and the rollers are drawn down and the rollers $q'$ just clear the rear ends of the cam-tracks by the time the cranks have made a half-revolution, the cam-tracks yielding or giving to the downward pressure of the rollers when the cranks pass from their quarter to the half turn. As the cranks approach the three-quarters turn the rollers $q'$ travel against the shaped cam-surfaces on the lower sides of the cam-track, and the rollers and tracks tilt and raise the arms $n$ and the pivotal guide-supports O, so that the rake-head is lifted and held in the raised position while it is being moved forward toward the cutter mechanism by the cranks completing the full revolution, the rollers $q'$ riding against the lower sides of the cam-tracks to sustain the rake in its raised position until the cranks have made a full revolution, by which time the rollers $q'$ will have moved far enough forward to clear the front ends of the pivoted cam-tracks Q, whereupon the rake will drop or fall by its own weight and assume its lowered position just in rear of the comb-cylinder and cutter apparatus.

To apply my harvester and thresher to a mowing-machine, the cutter apparatus or finger-bar of the mowing-machine is detached and my attachment is ranged alongside of the mowing-machine. The front end of the attachable machine of my invention is joined by the clip R to the knuckle from which the mowing-machine finger-bar was detached, and the pitman which furnished the power for the operation of the detached finger-bar is now connected to the sickle-bar of the cutter apparatus at the front end of the casing A. The rear end of the casing A is held in place by means of an arm $R'$, which has a clip $r$ at one end to fit around the axle of the mowing-machine, while the other end of the arm is attached to the casing A by having a hook fitted in suitable sockets. The front end of the casing on the outer or grain side opposite to the clip R is sustained by means of the caster-wheel $R''$, journaled in a hanger $R^3$, adjustably attached to the outside sill or beam $a$ in a manner to permit the caster-wheel to be raised or lowered. It will thus be seen that the front end of the casing A is sustained at one side by the caster-wheel and at its other side by the clip attached to the mowing-machine, while the lower rear part of the casing is adapted to travel on the ground or the stubble cut by the cutter apparatus B.

The power required to drive the shaft J is taken from the axle of the mowing-machine through the medium of a gear S, journaled in an attachable hanger $s$, adapted to be suitably fastened to the mowing-machine. The shaft $t$ of the gear is extended at one end and made square or of other angular form, as at $t'$, and over the square ends $j$ $t'$ of the shafts J $t$ are fitted the squared sockets of a transmitter-shaft T, which is adapted to be rotated by the shaft and gear $t$ S and to transmit the motion to the shaft J, said gear S meshing with a suitable gear on the axle of the mowing-machine.

The operation may be described as follows: When the harvester and thresher is properly coupled to the mowing-machine and the power connections made with the cutter apparatus and the driving-gear on the harvester and thresher, the machine is in condition for use. As the mower is drawn across the field of clover it carries with it the harvester and thresher, the several mechanisms of which are operated by the driving-gear, while the cutter apparatus B is driven directly by the mower-pitman; that is to say, the comb-cylinder is rotated over the cutter apparatus, the rake-head is reciprocated back and forth in the manner described between the comb-cylinder and the threshing mechanism, the threshing-cylinder itself is rotated within its breast and casing, and the brush is rotated to force the clover-seed through the concave screen and throw the refuse onto the top screen. As the machine advances the deflecting-roller in advance of the cutter apparatus holds the clover heads or pods away from the cutter apparatus until the teeth of the comb-cylinder sweep through and tear away the pods or heads, after which the cutter apparatus severs the upper part of the clover-stalks, the severed clover being delivered by the comb-cylinder and the cutter apparatus on the front part of the casing-bottom. The reciprocating rake-head carries the cut clover with it in the rearward movement toward the threshing-cylinder, after which the rake-head is lifted, forced forward, and dropped to take up a fresh load of clover. The clover is pushed by pressure of the rake against the mass of clover beneath the cylinder-casing, and the clover is carried by the toothed threshing-cylinder up the concave or breast and delivered in a threshed or separated condition over the upper edge of the breast and onto the concave fixed screen. The rotary brush sweeps against the loosened mass on this concave screen in a manner to force the clover-seed through the concave screen into the rear part of the casing A, but the stalks and refuse are carried by the brush up the concave screen and forced over the top rear edge of the same onto the inclined deflector. The refuse is deposited on the top side of the horizontal screen, the meshes in which permit any clover-seed in the mass of refuse to pass through into the rear part of the casing.

It will be noted that when the machine is to be transported to or from the field the mower-pitman may be disconnected from the cutter apparatus and the comb-cylinder may be thrown back over and upon the front back of the casing, thus throwing the harvester mechanism out of operative position.

I am aware that changes in the form and proportion of parts and in the details of construction of the mechanisms herein shown and described as the preferred embodiment of my invention may be made by a skilled mechanic without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. In a traveling clover harvester and thresher, the combination with a cutter apparatus, of a rotary comb-cylinder arranged to sweep close to the apparatus, and a deflecting-roller situated in advance of the cutter apparatus and out of the path of the comb-cylinder, substantially as and for the purposes described.

2. In a traveling clover harvester and thresher, the combination with a harvester mechanism, and a threshing mechanism, of a transverse rake-head provided with the slidable bars, a crank-shaft linked to said slidable bars to give endwise movement thereto and a reciprocating play to the transverse rake-head between the harvester mechanism and the threshing mechanism, the cams arranged in the path of projections on the slidable rake-bars, and the oscillating guides situated in advance of the cams and receiving the slidable bars of the rake to furnish supports for the rake when raised by the projections riding against the cams, as and for the purposes described.

3. In a traveling clover harvester and thresher, the combination with a harvesting mechanism and a threshing mechanism, of a reciprocating rake-head, oscillating guides, slidable bars fitted to play in said guides and fastened at their front ends to said rake-head and provided at their rear ends with suitable rollers, cam-tracks on which the rollers of the rake-bars are arranged to ride, and mechanism for reciprocating the rake-bars and head, substantially as and for the purposes described.

4. In a traveling clover harvester and thresher, the combination with a casing, a harvester mechanism, and a threshing mechanism, of the tiltable guides O pivotally supported within said casing, a transverse rake-head provided with slidable bars fitted to move freely in said tiltable guides, O, the yieldable cam-tracks Q supported in rear of the tiltable guides and arranged in the path of projections on said slidable rake-bars for the projections to ride against the upper and lower sides thereof, and means for imparting endwise movement to the slidable bars and reciprocating the rake-head between the harvester and thresher mechanisms, as and for the purposes described.

5. In a traveling clover harvester and thresher, the combination with a casing, a harvesting mechanism, and a threshing mechanism, of the tiltable guide-bars O pivotally supported within said casing, the rake-head, the slidable bars fitted in said tiltable guides, attached to the rake-head, and provided at their rear ends with suitable projections, as q, the spring-controlled cam-tracks supported in rear of said tiltable guides and lying in the path of the projections of said slidable bars, a crank-shaft, and pitmen connected to said crank-shaft and pivotally attached to said slidable bars at points in advance of the projections, q, as and for the purposes described.

6. In a traveling clover harvester and thresher, the combination with a low-down casing, a harvesting mechanism thereon, and a raking device, of the threshing and screening mechanisms comprising a short breast E″ extending upwardly from the floor of the casing, the front shield E³, the cylinder, the inclined fixed uprights f in rear of the cylinder-breast, a concave screen F fastened to said uprights, the side fenders F², also fastened to the uprights, a rotary brush G operating close to the screen, and an adjustable top fender pivotally supported above the brush and hanging over and beyond said brush and screen to deflect the particles thrown up by the action of the brush, as and for the purposes described.

7. In a traveling clover harvester and thresher, the combination with an open casing, a harvesting mechanism and a threshing mechanism, of the screening mechanism situated within the casing, in rear of the threshing mechanism, and comprising a stationary concave screen, a horizontal screen arranged over the upper open side of the casing and with its front edge in position to receive the contents from the concave screen, a rotary brush arranged to sweep close to the concave screen and to carry the refuse from the concave screen to the horizontal screen, and an adjustable top fender F³ pivotally supported above said brush and hanging beyond the concave screen and over the horizontal screen to deflect the particles thrown up by the brush onto said horizontal screen, substantially as and for the purposes described.

In testimony whereof I affix my signature in presence of two witnesses.

JESSE WISMAN DAVIS.

Witnesses:
JESSIE J. WHITTON,
H. L. MOORE.